(12) United States Patent
Marchetti et al.

(10) Patent No.: US 6,618,398 B1
(45) Date of Patent: Sep. 9, 2003

(54) ADDRESS RESOLUTION FOR INTERNET PROTOCOL SUB-NETWORKS IN ASYMMETRIC WIRELESS NETWORKS

(75) Inventors: Fabio Marco Marchetti, Plano, TX (US); Krishnakumar Pillai, Dallas, TX (US); Ranjith Weeresinghe, Allen, TX (US); Farshideh Ghazi Jahani, Dallas, TX (US); Giridhar K. Boray, Plano, TX (US); Hosame Abu-Amara, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/337,210

(22) Filed: Jun. 8, 1999

Related U.S. Application Data

(60) Provisional application No. 60/095,536, filed on Aug. 6, 1998.

(51) Int. Cl.[7] .................................................. H04J 3/24
(52) U.S. Cl. ........................ 370/475; 370/401; 455/428
(58) Field of Search ................................. 370/465, 466, 370/467, 469, 479, 475, 401, 328; 455/12.1, 428

(56) References Cited

U.S. PATENT DOCUMENTS

| | | | | | |
|---|---|---|---|---|---|
| 5,757,924 | A | * | 5/1998 | Friedman et al. | 380/49 |
| 6,067,453 | A | * | 5/2000 | Adiwoso et al. | 455/430 |
| 6,128,294 | A | * | 10/2000 | Oura et al. | 370/389 |
| 6,130,892 | A | * | 10/2000 | Short et al. | 370/401 |
| 6,256,314 | B1 | * | 7/2001 | Rodrig et al. | 370/401 |
| 6,307,843 | B1 | * | 10/2001 | Okanoue | 370/312 |
| 6,323,909 | B1 | * | 11/2001 | Michener et al. | 348/512 |

* cited by examiner

Primary Examiner—Lee Nguyen
Assistant Examiner—Tuan Tran
(74) Attorney, Agent, or Firm—John D. Crane; Bracewell & Patterson, L.L.P

(57) ABSTRACT

A method for address resolution in a wireless system, with an originating Satellite Interface Terminal (SIT) and a destination Satellite Interface Terminal (SIT2). An Address Resolution Protocol (ARP) packet of a source is modified when transmitted to a destination and when returned from the destination to the source. The modification involves substituting the SIT1 address for that of the source in the ARP request packet and substituting the SIT2 address for that of the destination in the ARP reply packet, respectively.

22 Claims, 3 Drawing Sheets

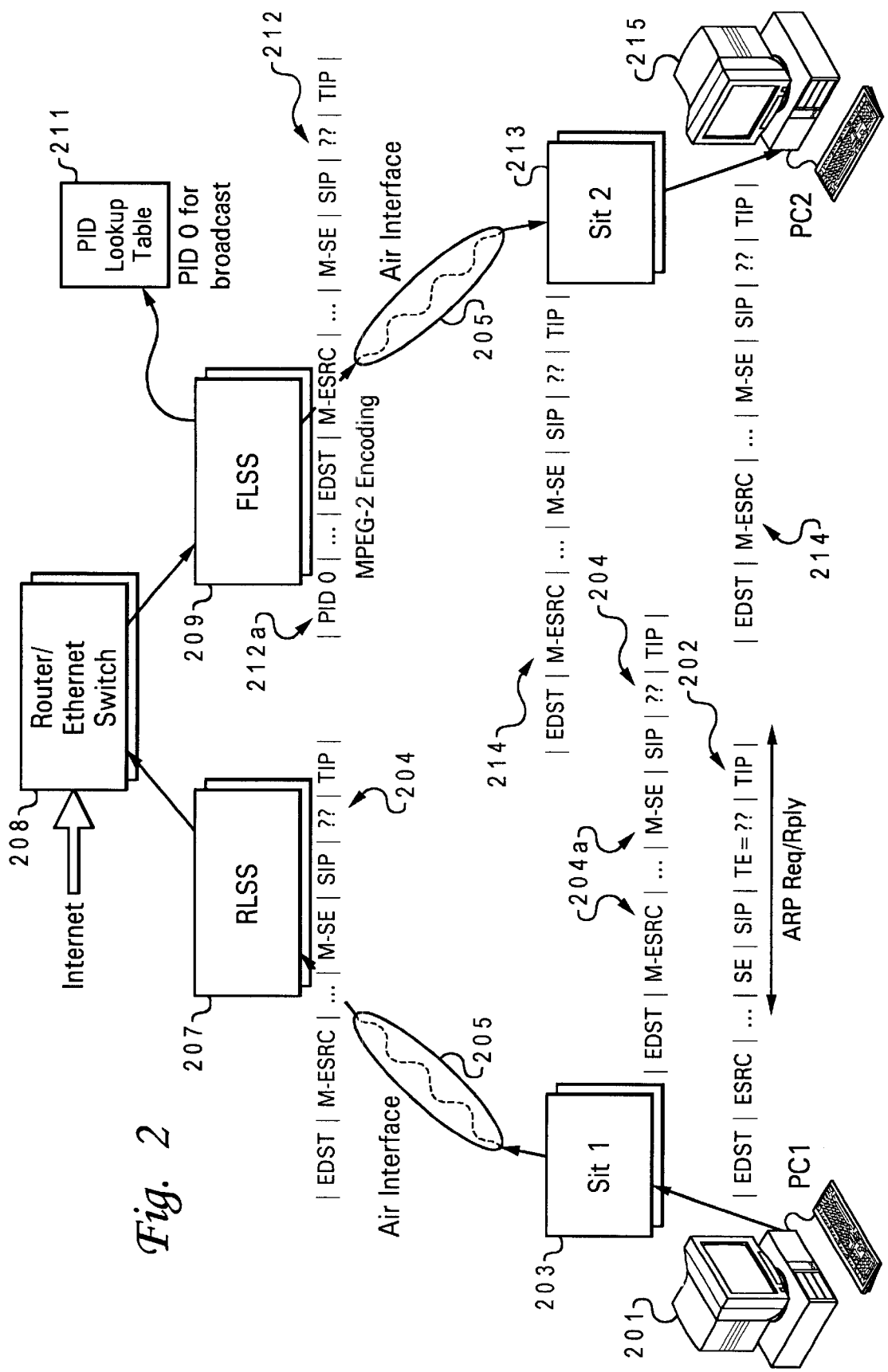

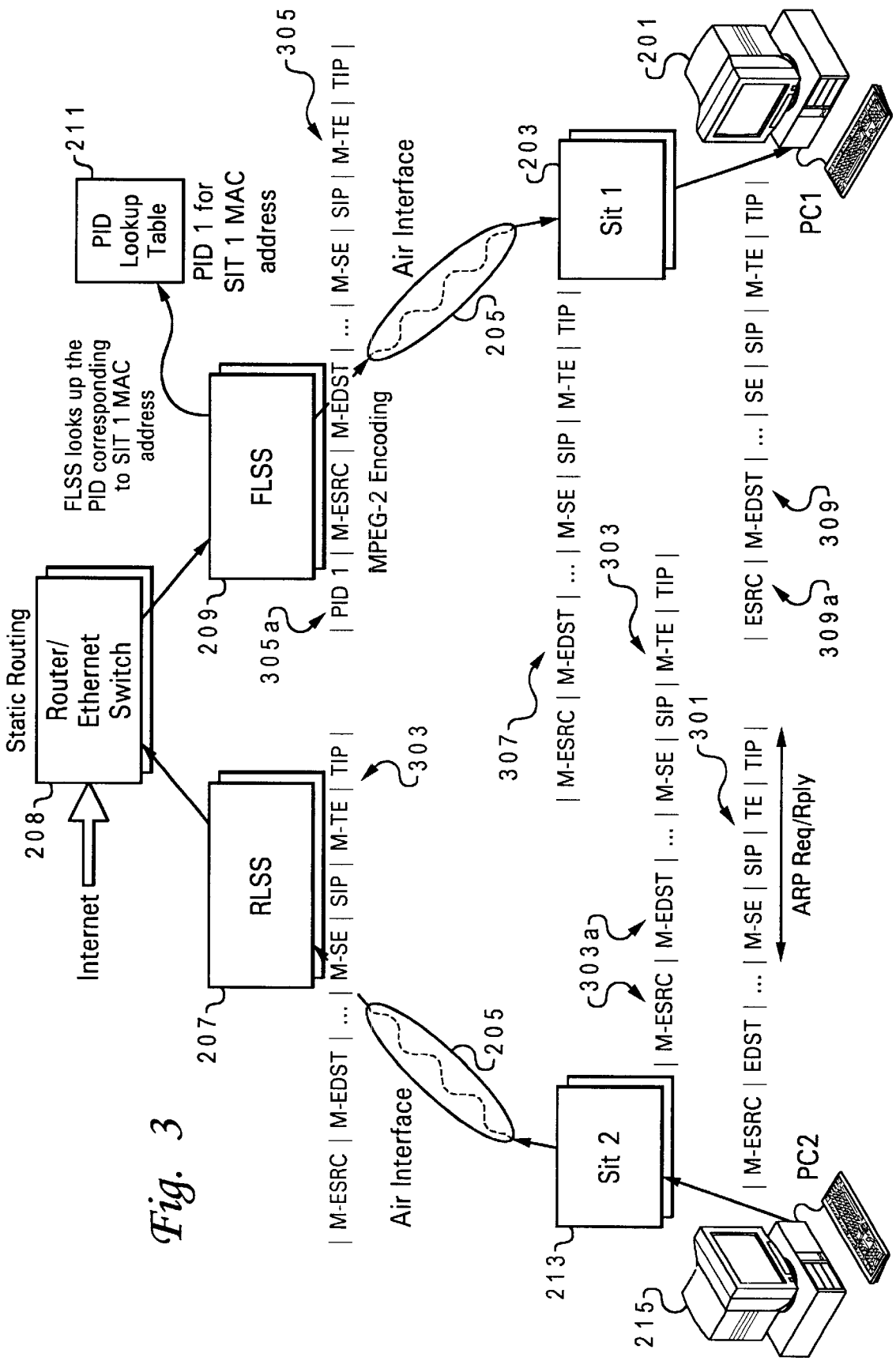

ADDRESS RESOLUTION FOR INTERNET PROTOCOL SUB-NETWORKS IN ASYMMETRIC WIRELESS NETWORKS

This Non-Provisional Application claims the benefit of U.S. Provisional Application No. 06/095,536, filed Aug. 6, 1998.

BACKGROUND OF THE INVENTION

1. Technical Field

The present invention relates generally to communication networks and in particular to a method and system for enhancing a wireless communication network. Still more particularly, the present invention relates to a method and system for address resolution in an asymmetrical wireless communication network.

2. Description of the Related Art

The development of computerized information resources such as the "Internet" and the proliferation of "Web" browsers, allow users of data-processing systems to link with other servers and networks, and thus retrieve vast amounts of electronic information previously unavailable in an electronic medium. In electronic communications, a set of computer networks which are possibly dissimilar from one another are joined together by "gateways" that handle data transfer and the conversion of messages from the sending network to the protocols utilized by the receiving network, with packets if necessary. A gateway is a device utilized to connect dissimilar networks (i.e., networks utilizing different communication protocols) so that electronic information can be passed from one network to the other. Gateways transfer electronic information via wired connections converting such information to a form compatible the protocols utilized by the second network for transport and delivery.

The term "Internet" is an abbreviation for "internetwork," and refers commonly to the collection of networks and gateways that utilize the "Transport Control Protocol/Internet Protocol," (TCP/IP) suite of protocols, which are well-known in the art of computer networking.

An internetwork is a collection of individual Local Area Networks (LAN) and network links joined by routers. Each individual LAN or network link constitutes a subnetwork. For data to flow from a computer application, through the computer to an external interface, over a LAN, and out through a router to an internetwork, there must be addresses which identify all of the various interfaces utilized along the way. Routers read the IP address to determine which physical port the data unit should be transmitted through.

IP addresses and port numbers combined create a unique socket address, maintained and monitored by the operating system. The socket concept allows multiple users (identified by the IP addresses) to,address the same application (identified by the port address). IP addresses are utilized at the network layer to route data units through the internet. The IP address identifies a machine's connection to the IP network not the physical address of a particular machine. Routers at the end of the delivery path must be responsible for changing the IP address into a machine address which can be utilized by the LAN protocol to deliver the data.

Internet Protocol (IP) is designed in general for application on symmetrical networks, where the properties of the outgoing and the incoming transmission links are identical. An important aspect involved in IP communication connection is the process of address resolution, implemented with the well known Address Resolution Protocol (ARP) when an unknown device is to be contacted. ARP resolves the Media Access Control (MAC) address currently associated with an IP address. The MAC address is the physical device address given by an authorized vendor, while the IP address classes are assigned statically or dynamically by a network.

In terrestrial networks with symmetric characteristics, address resolution is implemented as follows:

1. The requesting host broadcasts an ARP message with the source IP, MAC address, destination IP address and seeks the destination MAC address for IP visibility for subsequent Unicast communication; and
2. The destination host whose IP address matches the address in Step 1, responds to the requesting host with its MAC address filled in the appropriate field of the ARP message. Other hosts on the networks who receive the broadcast message in Step 1, and whose IP address does not match the destination IP address in step 1 will ignore the message.

In wireless networks (as in Satellite Systems) where the forward and the return transmission links utilize different underlying technologies (ex: Medium Frequency-Time Division Multiple Access (MF-TDMA) in return and Digital Video Broadcast (DVB) in forward), suitable modification to the address resolution procedures are required.

A technique for address resolution in a satellite system based on DVB in the forward link and a terrestrial telephone link in the return link (as in Hughes DirecPC) has been described in a technical report (ISR T.R. 96-20, Effective Extensions of Internet in Hybrid Satellite-Terrestrial Networks, Center for Satellite and Hybrid Communication Network). However, address resolution for a wireless system with asymmetrical communication links is not currently available. It would therefore be desirable and advantageous to have a method and system for address resolution in asymmetrical wireless communication networks.

SUMMARY OF THE INVENTION

It is one object of the present invention to provide an improved method and system for communication networks.

It is another object of the present invention to provide an improved method and system for enhancing a wireless communication network.

It is yet another object of the present invention to provide an improved method and system for address resolution in an asymmetrical wireless communication network.

The above features are achieved as follows. A method is disclosed for address resolution in a wireless system, with an originating interface terminal and a destination interface terminal. An Address Resolution Protocol (ARP) packet of a source is modified when transmitted from a source to a destination and when returned from the destination to the source. In an illustrative embodiment, the interface terminals are Satellite Interface Terminals (SIT) and the modification involves substituting the originating SIT address for that of the source in the ARP request packet and substituting the destination SIT address for that of the destination in the ARP reply packet, respectively.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 illustrates an ARP request procedure according to the preferred embodiment of the present invention; and FIG. 3 illustrates an ARP reply procedure according to the preferred embodiment of the present invention.

DESCRIPTION OF AN ILLUSTRATIVE EMBODIMENT

Figure 1:
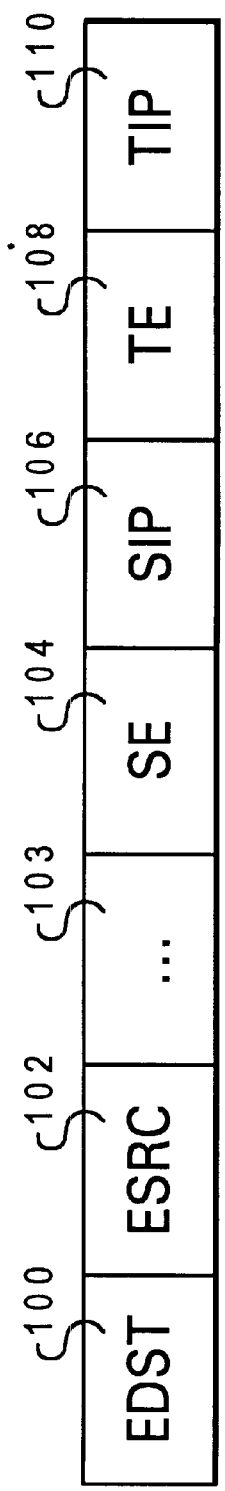
FIG. 1 is a diagram of the internal sub-components of an ARP message according to the preferred embodiment of the present invention.

With reference now to the figures, several related diagrams of a novel Address Resolution Protocol (ARP) request and reply procedures utilizing a modified ARP are depicted in accordance with the preferred embodiment of the present invention.

This invention provides a unique technique for MAC/IP address resolution in asymmetric networks (i.e., networks with a different medium in the forward and backwards path) with large round trip times. In the preferred embodiment, the invention is implemented on a satellite routing network; however, the invention as implemented is compatible with existing Digital Video :Broadcast (DVB)standards and may also be extended to other asymmetrical networks.

FIG. 1 depicts the internal sub-components of an ARP utilized within the invention. ARP, also referred to in various stages of the invention as an IP datagram or encapsulated message, is subdivided into a series of components. These include a destination Ethernet address (EDST) 100, a six (6) byte Ethernet source address (ESRC) 102, sender Ethernet address (SE) 104, sender IP address (SIP) 106, target (receiver) IP address (TIP) 108, and target Ethernet address (TE) 110. EDST 100 refers to the address of the end device (eg. a computer) which receives the communication. The target in this illustrative embodiment references a Satellite Interface Terminal (SIT) at which EDST 100 is connected to the network. The order of the sub-components are dictated by the protocol. Further, additional sub-components 103 may be present in the ARP. The sub-components each hold a changeable value, several of which are modified during implementation of the preferred embodiment. For example, the ESRC is modified and replaced within ARP with modified ESRC (M-ESRC).

The present invention modifies the ARP. ARP is part of the IP protocol stack and is an Interior Gateway Protocol (IGP). ARP provides translation of IP addresses into machine addresses. This requires communications with end nodes or computers on a LAN.

The router within a LAN will utilize mapping tables, which map the IP addresses received to the proper machine address. Before this,clan be done, the router learns the machine address. The router communicates with all nodes on the LAN to determine which machine addresses are reachable and what their respective IP addresses are.

When the router receives a data unit, it checks its mapping table to see if there is an entry for the IP address received. If there is, the router can create a packet (such as an Ethernet packet) and transmit the data over the LAN.

If there is no entry for the IP address, the router sends an ARP broadcast message over the LAN. All active nodes on the LAN will see the broadcast message and process it. If a node recognizes the IP address in the broadcast message as its own, it will reply with its machine address. This is then placed in Random Access Memory (RAM) cache for temporary storage.

The cache entry is not a permanent entry. The purpose of the ARP cache is to provide a temporary mapping table so that the router does hot have to continuously send broadcast messages over the LAN. There is a parameter associated with every entry which determines how long the particular entry shall remain in cache. When the entry expires, the router has to send a broadcast message again to receive that node's machine address.

The ARP cache can also identify the hardware type (such as Ethernet or Token Ring), which is important for multi-protocol routers. These routers may have connections to several different types of LANs, and they need to know what type of protocol packet needs to be created to route the IP packet to the host.

Also included in this table are the type of protocols utilized to obtain the routing information (such as ARP or Routing Information Protocol (RIP)), the routing age (how long the information has been in cache), and the subnet mask for the destination host.

ARP is utilized by routers when addressing hosts which know their IP address. This requires a workstation (or PC) with some form of permanent storage (such as hard drive). The IP address is configured into the host (through IP client software) so that the PC knows its identity.

An illustrative embodiment of the invention as implemented within a satellite environment is presented in FIG. 2 and FIG. 3. The process begins with a request procedure and ends with a reply procedure between a sender IP Device (PC1) 201 and receiver/destination IP device (PC2 ) 215. PC1 201 broadcasts an ARP request packet that is transmitted to all of the Satellite Interface Terminals (SIT) on the subnet. During this initial broadcast of ARP 202, EDST value is "FFF" and TE value is unknown.

Satellite Interface Terminal 1 (SIT1) 203 replaces PC1 201 Ethernet MAC address with its own MAC address 204a in the ARP Protocol Data Unit (PDU) and in the source field of the IP datagram to create a modified ARP request packet 204.

The processes of interchanging the address in SIT1 203 and SIT2 213 may be within an algorithm located in the processor of SIT1 203 and SIT2 213. Alternatively, the processor may be a separate network data processing system, such as a switch. In the preferred embodiment, most of the processing (establishing links and sending and receiving signals, etc.) required to implement the MAC protocol is instantiated as a software algorithm within a data processing system located within or connected to the overall system. In traditional systems, these data processing systems are located within a router which is represented herein as a Forward Link Subsystem (FLSS). In the preferred embodiment, a FLSS provides the implementation algorithm necessary to instantiate the modified ARP protocol.

The present invention also may be implemented in other data processing systems. For example, the processes of the present invention may be implemented within a computer having a connection to a FLSS in which the computer provides the logic and commands to the FLSS to implement the processes utilized.

Returning now to FIG. 2, modified ARP request packet 204 is transmitted over air interface link 205 and received by Receive Link Subsystem (RLSS) 207, and is then passed along to Internet Router (IR)/Ethernet Switch (ES) 208 at the hub. FIG. 2 depicts a combination IR/ES 208; however, other implementations separate the router from the ethernet switch. In such an embodiment, the ethernet switch is located both on the forward path and the backward path and the signals travelling in to and out of the router go through the ethernet switch for both paths.

Returning to FIG. 2, IR/ES 208 statistically routes (with a standard or a proprietary protocol) the packet to Forward link Subsystem (FLSS) 209. FLSS 209 analyzes the destination MAC address field contents and determines that the message is intended for broadcast. FLSS 209 utilizes a special Program Identifier (PID) value 212a in the MPEG-2 stream, encapsulates IP packets 212 utilizing MPEG-2 encoding, and broadcasts the message over DVB forward air interface link 205. FLSS 209 obtains PID value 212a from a PID look-up table 211. In this illustration, PID0 is the value assigned for broadcast.

SIT2 213 in the sub-network receives broadcast message 214 and will in turn relay the same to any IP devices (such as PCs) hosted off of it. The destination IP device (PC2) 215, in this illustration, realizes the match with its own address and proceeds to reply to the ARP request with its MAC address.

FIG. 3 now illustrates the ARP reply process. In this process, an ARP reply packet is generated which interchanges the sender Ethernet address and destination address of FIG. 1. The transmission path is reversed from FIG. 2. ARP reply packet 301 is sent by PC2 215 to SIT2 213 with the destination MAC address of SIT1 203. SIT2 213 replaces the source address field of the IP datagram as well as the target Ethernet MAC address of the ARP PDU with its own MAC address 303a to create a modified ARP reply packet 303.

Modified ARP reply packet 303 is forwarded over air interface link 205 to RLSS 207 and then IR/ES 208. IR/ES 208 statically forwards modified ARP reply packet 303 to FLSS 209. FLSS 209 analyzes the destination MAC address field contents, and determines the appropriate PID 305a corresponding to SIT1 203. In this embodiment, PID1 is utilized as this value and is obtained from PID look-up table 211 as in the forward path. FLSS 209 encapsulates the modified AR.P reply packet 303 via MPEG-2 encoding and transmits the encapsulated message 305 over the DVB forward air interface link 205 utilizing the PID value 305a determined.

SIT1 203 upon receipt of the ARP reply packet 307 confirms a match with its MAC address and substitutes the MAC address with that of PC1 201 hosted off of it, corresponding to the IP address in the source address field 309a of the IP datagram 309.

The invention as described above screens the MAC addresses of the far end IP devices (PC1, PC2 in this illustration) with the MAC addresses of the associated Satellite Interface Terminals, thereby providing a Unicast functionality at the FLSS.

In addition, the invention provides two major advantages:
1. The present invention avoids the need for the FLSS to store and manage the MAC addresses of a potentially large number of terminating IP devices; and
2. The present invention easily supports an arbitrary extension of the IP subnet behind a SIT device. The wide coverage offered by satellite based communication systems can be utilized with this invention functionally to aggregate distantly located physical devices unto the same subnet.

Further, the present invention is easily extended to the general case of the SITs being part of different IP sub-networks with a spoofing mechanism implemented at the IP router associated with the FLSS.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention.

What is claimed is:

1. A method for address resolution in a wireless system, with an originating interface terminal and a destination interface terminal, said method comprising:

replacing at said originating interface terminal a source address within an Address Resolution Protocol (ARP) request packet issued from a source device with an address of said origination air interface terminal to Winch said packet is issued wherein said origination air interface terminal operates as a gateway for at least one connected source device, including said source device having said source address different from the address of said origination air interface terminal, and wherein said replacing step generates a modified ARP request packet and includes (i) replacing an Ethernet MAC address of said source device with a MAC address of said originating air interface terminal in an ARP Protocol Data Unit (PDU) and (ii) replacing said Ethernet MAC address of said source device with the MAC address of said originating air interface terminal in a source field of an Internet Protocol (IP) datagram of said source device;

transmitting said modified ARP request packet to a destination air interface terminal via an air interface, said destination air interface terminal operating as a gateway for at least one destination device having a destination address different from an address of said destination air interface terminal;

responsive to a receipt of a modified ARP reply packet transmitted via said air interface from said destination air interface terminal;

substituting an address of said origination air interface terminal within said reply packet with that of said source device; and forwarding said ARP reply packet to said source device using the source address.

2. The method of claim 1, wherein said originating air interface terminal and said destination air interface terminal are satellite interface terminals that are both capable of supporting multiple source/destination devices having different addresses, and said transmitting step includes:

transmitting said modified ARP request packet via a satellite air interface and receiving said modified ARP reply packet via said satellite air interface; and when it is determined at the destination satellite interface terminal (STI2) that a received packet is said modified ARP request packet, replying to said modified ARP request packet with a modified ARP reply packet in which a destination address is replaced with an address of said destination satellite interface terminal.

3. The method of claim 2, wherein said replying step further includes the steps of:

analyzing said modified ARP request packet received at said destination to determine if it has been modified; and replacing a source address field of said ARP reply packet and a target Ethernet MAC address of said ARP PDU with a MAC address of said destination satellite interface terminal when an ARP request packet received at said destination has been modified.

4. The method of claim 3, wherein said replacing step is completed at said destination satellite interface terminal.

5. The method of claim 3, wherein said replying step further comprises the steps of:
analyzing said destination MAC address field in said ARP reply packet to determine an appropriate PID value corresponding to said originating satellite interface terminal; and
encapsulating said ARP reply packet within an MPEG stream utilizing said appropriate PID value and MPEG-2 encoding.

6. The method of claim 2, wherein:
said substituting step further comprises:
substituting a MAC address of said originating satellite interface terminal in said ARP reply packet with a MAC address of said source, said substituting being competed at said originating satellite interface terminal; and
said forwarding step comprises transmitting said ARP reply packet containing address resolution information from said originating satellite interface terminal to said source.

7. The method of claim 1, said replacing step comprising substituting a media access control (MAC) address of said source device in said transmitted ARP request packet with a MAC address of said originating interface terminal to generate said modified ARP request packet.

8. The method of claim 1, wherein said transmitting step includes the steps of:
analyzing a destination MAC address field of said modified ARP request packet to determine if intended for broadcast; and
encapsulating said modified ARP request packet when said ARP is intended for broadcast.

9. The method of claim 8, said encapsulating step includes the steps of:
assigning a Program Identifier (PID) value to said modified ARP utilizing MPEG-2 encoding; and
encapsulating said IP packet within an MPEG stream generated by said MPEG-2 encoding.

10. The method of claim 8, wherein said analyzing and encapsulating steps are completed within a Forward Link Subsystem (FLSS).

11. A system for address resolution in a wireless system having an originating interface terminal and a destination interface terminal, said system comprising:
means for replacing at said originating air interface terminal a source address within an Address Resolution Protocol (ARP) request packet issued from a source device with an address of said origination air interface terminal to which said packet is issued, wherein said origination air interface terminal operates as a gateway for at least one connected source device, including said source device having said source address different from the address of said origination air interface terminal, and wherein said replacing step generates a modified ARP request packet and includes (i) means for replacing an Ethernet MAC address of said source device with a MAC address of said originating air interface terminal in an ARP Protocol Data Unit (PDU) and (ii) means for replacing the Ethernet MAC address of said source device with a MAC address of said originating air interface terminal in a source field of an Internet Protocol (IP) datagram of said source device;
means for transmitting said modified ARP request packet to a destination air interface terminal via an air interface, said destination air interface terminal operating as a gateway for at least one destination device having a destination address different from an address of said destination air interface terminal; and
means responsive to a receipt of a modified ARP reply packet transmitted via said air interface from said destination air interface terminal, for:
substituting an address of said origination air interface terminal within said reply packet with that of said source device; and
forwarding said ARP reply packet to said source device using the source address.

12. The system of claim 11, wherein said originating air interface terminal and said destination air interface terminal are satellite interface terminals that are both capable of supporting multiple source/destination devices having different addresses, and said transmitting means includes:
means for transmitting said modified ARP request packet via a satellite air interface and receiving said modified ARP reply packet via said satellite air interface; and
means, when it is determined at the destination satellite interface terminal (SIT2) that a received packet is said modified ARP request packet, for replying to said modified ARP request packet with a modified ARP reply packet in which a destination address is replaced with an address of said destination satellite interface terminal.

13. The system of claim 12, wherein said replying means further includes:
means for analyzing said modified ARP request packet received at said destination to determine if it has been modified; and
means for replacing a source address field of said ARP reply packet and a target Ethernet MAC address of said ARP PDU with a MAC address of said destination satellite interface terminal when an ARP request packet received at said destination has been modified.

14. The system of claim 13, wherein said replacing means is associated with said destination interface terminal.

15. The system of claim 13, wherein said replying means further comprises:
means for analyzing said destination MAC address field in said ARP reply packet to determine an appropriate PID value corresponding to said originating satellite interface terminal; and
means for encapsulating said ARP reply packet within an MPEG stream utilizing said appropriate PID value and MPEG-2 encoding.

16. The system of claim 15, wherein;
said substituting means further comprises means for substituting a MAC address of said originating satellite interface terminal in said ARP reply packet with a MAC address of said source, said substituting being competed at said originating satellite interface terminal; and
said forwarding means comprises means for transmitting said ARP reply packet containing address resolution information from said originating satellite interface terminal to said source.

17. The system of claim 11, said replacing means comprising substituting a Media Access Control (MAC) address of said source device in said transmitted ARP request packet with a MAC address of said originating interface terminal to generate said modified ARP request packet.

18. The system of claim 11, wherein said transmitting means includes:
   means for analyzing a destination MAC address field of said modified ARP request packet to determine if intended for broadcast; and
   means for encapsulating said modified ARP request packet when said ARP is intended for broadcast.

19. The system of claim 18, said encapsulating means includes:
   means for assigning a Program Identifier (PID) value to said modified ARP utilizing MPEG-2 encoding; and
   means for encapsulating said IP packet within an MPEG stream generated by said MPEG-2 encoding.

20. The system of claim 18, wherein said analyzing and encapsulating means are included within a Forward Link Subsystem (FLSS).

21. A system for address resolution in a wireless system, with an originating Satellite Interface Terminal (SIT1) and a destination Satellite Interface Terminal (SIT2), said system comprising:
   means for masking a medium access control MAC address of far end Internet protocol devices with a MAC address of an associated satellite interface terminal to which said devices are connected, said means for masking including; and
   means for replacing at said associated satellite air interface terminal a first address within an Address Resolution Protocol (ARP) request packet issued from a device with an address of said associated satellite air interface terminal to which said packet is issued, wherein said associated satellite air interface terminal operates as a gateway for at least one connected device, including said device having said first address different from the address of said associated satellite air interface terminal, and said replacing step generates a modified ARP request packet and includes (i) means for replacing an Ethernet MAC address of said device with a MAC address of the associated satellite interface terminal in an ARP Protocol Data Unit (PDU) and (ii) means for replacing the Ethernet MAC address of said device with a MAC address of the associated satellite interface terminal in a source field of an Internet Protocol (P) datagram of said device;
   means for providing said MAC address of said satellite interface terminal to a source device of a forward link subsystem via an air interface operating according to Unicast functionality.

22. The system of claim 21, said means for masking further comprising:
   means for transmitting said modified ARP request packet to a destination air interface terminal via an air interface, said destination air interface terminal operating as a gateway for at least one destination device having a destination address different from an address of said destination air interface terminal,
   means responsive to a receipt of a modified ARP reply packet transmitted via said air interface from said destination air interface terminal, for:
      substituting an address of said origination air interface terminal within said reply packet with that of said source device; and
      forwarding said ARP reply packet to said source device using the source address; and
   means responsive to a receipt of a modified ARP request packet transmitted via said air interface from said destination air interface terminal, for:
      generating an ARP reply packet; and
      replacing a source address field of said ARP reply packet and an target Ethernet MAC address of said ARP PDU with a MAC address of said destination satellite interface terminal when an ARP request packet received has been modified.

* * * * *

UNITED STATES PATENT AND TRADEMARK OFFICE
CERTIFICATE OF CORRECTION

PATENT NO.     : 6,618,398 B1
DATED          : September 9, 2003
INVENTOR(S)    : Marchetti et al.

It is certified that error appears in the above-identified patent and that said Letters Patent is hereby corrected as shown below:

Column 6,
Line 17, delete "Winch" and insert -- which --.

Signed and Sealed this

Twenty-seventh Day of January, 2004

JON W. DUDAS
*Acting Director of the United States Patent and Trademark Office*